G. L. DILLARD & W. JOHNS.
TIRE PROTECTOR.
APPLICATION FILED SEPT. 4, 1914.
1,153,042.
Patented Sept. 7, 1915.
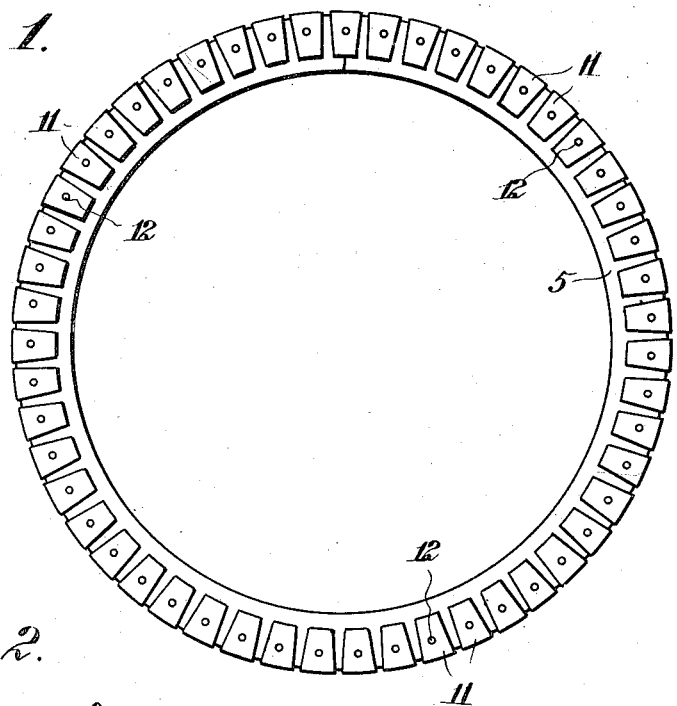
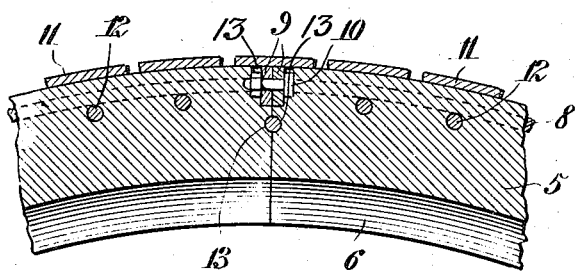
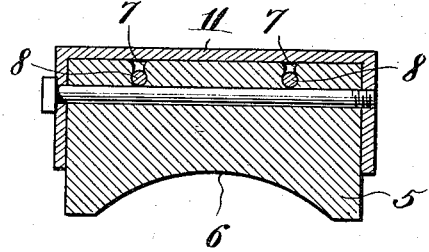
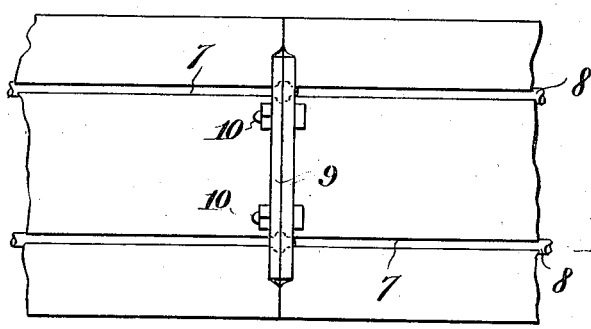
Inventors
George L. Dillard.
William Johns.
By Victor J. Evans,
Attorney.
Witnesses:

UNITED STATES PATENT OFFICE.

GEORGE L. DILLARD AND WILLIAM JOHNS, OF MOGOLLON, NEW MEXICO.

TIRE-PROTECTOR.

1,153,042.
Specification of Letters Patent.
Patented Sept. 7, 1915.

Application filed September 4, 1914. Serial No. 860,238.

*To all whom it may concern:*

Be it known that we, GEORGE L. DILLARD and WILLIAM JOHNS, a citizen of the United States of America and a subject of the King of Great Britain, respectively, residing at Mogollon, in the county of Socorro and State of New Mexico, have invented new and useful Improvements in Tire-Protectors, of which the following is a specification.

The invention relates to tire armors, and more particularly to the class of automobile tire protectors.

The primary object of the invention is the provision of a protector of this character wherein the same can be readily and quickly mounted on a tire either by slipping it thereon or by opening the protector, thus the latter when on the tire will be held thereon so as to prevent skidding or the puncturing of the same.

Another object of the invention is the provision of a tire protector wherein the tread plates or members can be renewed at will without requiring the detachment of the protector from the tire, thus increasing the life of service thereof.

A further object of the invention is the provision of a tire protector wherein the same is of novel form to fit snugly a tire irrespective of any slight variation in its diameter.

A still further object of the invention is the provision of a tire protector which is simple in construction, reliable and efficient in use, and inexpensive in manufacture.

With these and other objects in view, the invention consists in the construction, combination and arrangement of parts as will be hereinafter fully described, illustrated in the accompanying drawing, and pointed out in the claims hereunto appended.

In the drawing, Figure 1 is a side elevation of the tire armor constructed in accordance with the invention. Fig. 2 is a fragmentary vertical longitudinal sectional view thereof. Fig. 3 is a vertical transverse sectional view. Fig. 4 is a plan view, looking at its tread.

Similar reference characters indicate corresponding parts throughout the several views in the drawing.

Referring to the drawings in detail, the tire protector comprises a tire embracing tread section or ring 5, preferably made from flexible material, separated at a point of the circumference of said section or ring, the inner side of the latter being formed with a channel or groove 6, providing a seat for a resilient tire for use on automobiles, while the outer side is flat to form an even tread at its outer periphery.

Formed in the outer periphery of the section or ring 5 are two or more grooves 7 receiving tensioning wires or cables 8 which are seated therein circumferentially of the same, while embedded in the ends of said section or ring at the point of separation thereof are terminal anchoring plates 9 to which are secured the ends of the wires or cables 8 and through these plates are passed bolt members 10 for connecting the ends of the section or ring together.

Carried by the section or ring 5 are tread wearing plates 11 which are substantially U-shaped and straddle the outer periphery of the section or ring at intervals thereof. Passed through the end portions of the U-shaped plates 11 are bolts 12, which are also passed transversely through the section or ring within the diameter of the wires or cables 8, one of the U-shaped plates being disposed over the joint between the ends of the section or ring 5 to conceal the terminal plates 9, the bolt securing the plate 11 being engaged in seats 13 formed in the ends of said section or ring.

In the application of the protector the same may be applied either by opening the section or ring for receiving the tire while inflated and on the wheel of a vehicle, or the said tire can be collapsed and the protector slipped on the same, without opening the section or ring at the point of separation therein.

What is claimed is:

1. A tire protector comprising an annulus having a concaved inner surface forming a seat for receiving a resilient tire for concentrically mounting the annulus relative thereto, and also having spaced circumferential grooves in the outer periphery opening through the outer surface thereof, tension cables arranged in the grooves and having their ends connected together, a plurality of substantially U-shaped tread wearing plates bridging the outer periphery of the annulus at intervals thereof, and pins passed transversely through the annulus inwardly with relation to the cables and engaged in the limbs of the tread plates for the fastening of the same in position on the annulus.

2. A tire comprising a transversely split annulus having a concaved inner surface forming a seat for receiving a resilient tire for concentrically mounting the annulus relative thereto, and also having spaced circumferential grooves in the outer periphery opening through the outer surface thereof, tension cables arranged in the grooves and having their ends connected together, a plurality of substantially U-shaped tread wearing plates bridging the outer periphery of the annulus at intervals thereof, and pins passed transversely through the annulus inwardly with relation to the cables and engaged in the limbs of the tread plates for the fastening of the same in position on the annulus, one of said tread plates overlapping the ends of the annulus and having its pin located between the said ends.

In testimony whereof we affix our signatures in presence of two witnesses.

GEORGE L. DILLARD.
WILLIAM JOHNS.

Witnesses:
 THOMAS MOLONEY,
 CHARLES FREDLUND.